Patented Apr. 22, 1947

2,419,259

UNITED STATES PATENT OFFICE 2,419,259

PREPARATION OF 5-DIETHYLAMINO-2-PENTANONE

Sylvan E. Forman, Baltimore, Md., assignor to U. S. Industrial Chemicals, Inc., New York, N. Y., a corporation of Delaware No Drawing. Application February 21, 1945, Serial No. 579,158

1 Claim. (Cl. 260—584)

This invention relates to the preparation of 5-diethylamino-2-pentanone, a product which is useful in the preparation of vitamin $B_1$ and other compounds.

The compound 5-diethylamino-2-pentanone is known. It is a colorless liquid boiling at 94–95° C. at 20 mm. pressure. The method previously suggested for the preparation of this compound is not readily adaptable for commercial operation.

It is the object of the present invention to provide a simple, efficient and economical method of producing 5-diethylamino-2-pentanone which will facilitate the commercial preparation of that product.

Other objects and advantages of the invention will be apparent as it is better understood by reference to the following specification, in which the preferred procedure is described.

The novel method of preparing 5-diethylamino-2-pentanone according to the invention depends upon the reaction of acetylpropyl chloride with diethylamine. The reaction is indicated as follows:

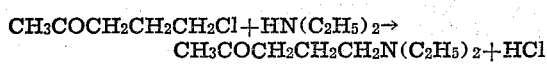

An essential of good yields with this reaction is the absence of water. The acetylpropyl chloride and diethyl amine should be substantially anhydrous. The permissible amount of water is not over 0.5%, and a smaller percentage is preferable.

The acetylpropyl chloride is prepared preferably by the procedure disclosed in my co-pending application Serial No. 579,159, filed February 21, 1945. This procedure in general involves the reaction of acetyl butyrolactone with aqueous hydrochloric acid, followed by distillation to separate the acetylpropyl chloride, a colorless liquid boiling at 71–72° C. at 20 mm. pressure.

As an example of the improved procedure, a mixture of 22 mols of diethyl amine with 10 mols of acetylpropyl chloride is placed in a suitable flask provided with a reflux condenser and heated for an extended period, for example about forty-eight hours, to permit completion of the reaction. When the reaction is complete, a solution of 500 grams of sodium hydroxide in 1700 cc. of water is added with constant stirring to liberate the free amine bases from their hydrochloric acid salts formed during the reaction. The solution separates into two layers. The upper layer is withdrawn and subjected to fractionation. The 5-diethylamino-2-pentanone, boiling at 94–95° C. at 20 mm. pressure may be recovered. A yield of 71% is obtained. In addition to the 5-diethylamino-2-pentanone, a fraction consisting of methyl cyclopropyl ketone may be recovered at a boiling point of 111–113° C. The methyl cyclopropyl ketone can be reconverted readily to acetylpropyl chloride by treatment with hydrochloric acid, so that it may be reused. The yield of 5-diethylamino-2-pentanone is approximately 71%.

Alternatively, after addition of sodium hydroxide the mixture may be fractionated without separation as described until all of the diethyl amine has been removed. The remaining mixture is in two layers. The lower aqueous layer is discarded and the upper layer is fractionated under reduced pressure to recover 5-diethylamino-2-pentanone.

The procedure as described is capable of operation on a commercial basis. The procedure is simple and the yield is satisfactory. The primary precaution which is necessary to ensure satisfactory results is the maintenance of a water content in the mixture of less than 0.5%. Increased proportions of water result in a progressively higher reduction in the yield of the desired product.

Various changes may be made in the procedure as described without departing from the invention or sacrificing the advantages thereof.

I claim:

The method of preparing 5-diethylamino-2-pentanone which comprises heating a mixture, containing not more than 0.5% of water, of acetylpropyl chloride and diethyl amine until the reaction is complete, liberating the free amines from their salts with aqueous caustic, distilling off the diethyl amine, separating the supernatant layer and fractionating that layer to recover the desired product.

SYLVAN E. FORMAN.

REFERENCES CITED

The following references are of record in the file of this patent:

UNITED STATES PATENTS

| Number | Name | Date |
|---|---|---|
| 2,107,197 | Butignot | Feb. 1, 1938 |

OTHER REFERENCES

Chem. Abstracts, vol. 1 (1907), page 2477. (Copy in Pat. Off. Lib.)